US008989952B2

(12) United States Patent
Simon

(10) Patent No.: US 8,989,952 B2
(45) Date of Patent: Mar. 24, 2015

(54) SYSTEM AND METHOD FOR DETECTING VEHICLE CRASH

(71) Applicant: Sascha Simon, Warwick, NY (US)

(72) Inventor: Sascha Simon, Warwick, NY (US)

(73) Assignee: Apio Systems, Inc., Warwick, NY (US)

( * ) Notice: Subject to any disclaimer, the term of this patent is extended or adjusted under 35 U.S.C. 154(b) by 0 days.

(21) Appl. No.: 14/105,744

(22) Filed: Dec. 13, 2013

(65) Prior Publication Data

US 2014/0180529 A1 Jun. 26, 2014

Related U.S. Application Data

(63) Continuation-in-part of application No. 14/072,231, filed on Nov. 5, 2013, and a continuation-in-part of application No. 14/095,156, filed on Dec. 3, 2013.

(60) Provisional application No. 61/740,814, filed on Dec. 21, 2012, provisional application No. 61/740,831, filed on Dec. 21, 2012, provisional application No. 61/740,851, filed on Dec. 21, 2012, provisional application No. 61/745,677, filed on Dec. 24, 2012.

(51) Int. Cl.
*G06F 7/00* (2006.01)
*H04M 11/04* (2006.01)
*G01S 13/00* (2006.01)
*G08G 1/00* (2006.01)

(52) U.S. Cl.
CPC .................................... *G08G 1/205* (2013.01)
USPC .......................... 701/31.5; 455/404.2; 342/70

(58) Field of Classification Search
USPC .......................... 701/31.5; 455/404.2; 342/70
See application file for complete search history.

(56) References Cited

U.S. PATENT DOCUMENTS 5,785,347 A 7/1998 Adolph et al.
6,411,250 B1 * 6/2002 Oswald et al. .................. 342/70
7,136,828 B1 11/2006 Allen et al.
7,415,126 B2 * 8/2008 Breed et al. .................. 382/100
7,904,053 B2 * 3/2011 Krasner et al. ............ 455/404.2

(Continued)

FOREIGN PATENT DOCUMENTS

EP 0461888 A2 12/1991
JP 10-260241 A 9/1998

(Continued)

OTHER PUBLICATIONS

PCT/US2013/076432 International Search Report and Written Opinion, Apr. 9, 2014, Ham, Joung Hyun.

(Continued)

*Primary Examiner* — Thomas G Black
*Assistant Examiner* — Tyler Paige
(74) *Attorney, Agent, or Firm* — John T. Whelan

(57) ABSTRACT

A device is provided for use with a vehicle. The device includes a mode-determining component, a first detecting component and a second detecting component. The mode-determining component can generate an in-vehicle signal. The first detecting component can detect a first parameter and can generate a first detector signal based on the first detected parameter. The second detecting component can detect a second parameter and can generate a second detector signal based on the second detected parameter. The mode-determining component can further generate a crash mode signal based on the in-vehicle signal, the first detector signal and the second detector signal.

18 Claims, 6 Drawing Sheets

(56) References Cited

U.S. PATENT DOCUMENTS

| | | | | |
|---|---|---|---|---|
| 8,082,014 | B2 * | 12/2011 | Causey et al. | 455/575.9 |
| 2003/0029345 | A1 | 2/2003 | Tiernan et al. | |
| 2003/0209893 | A1 * | 11/2003 | Breed et al. | 280/735 |
| 2004/0152471 | A1 | 8/2004 | Macdonald et al. | |
| 2004/0257208 | A1 | 12/2004 | Huang et al. | |
| 2006/0085153 | A1 | 4/2006 | Oesterling et al. | |
| 2006/0089153 | A1 | 4/2006 | Sheynblat | |
| 2007/0021915 | A1 * | 1/2007 | Breed et al. | 701/301 |
| 2008/0203814 | A1 | 8/2008 | Kamiya | |
| 2008/0287143 | A1 | 11/2008 | Banks et al. | |
| 2009/0037056 | A1 | 2/2009 | Erb | |
| 2009/0309709 | A1 | 12/2009 | Bevacqua et al. | |
| 2010/0063649 | A1 * | 3/2010 | Wu et al. | 701/1 |
| 2011/0169654 | A1 | 7/2011 | Ketari | |
| 2011/0301795 | A1 | 12/2011 | Failing | |
| 2012/0123634 | A1 | 5/2012 | Shimizu | |
| 2012/0135764 | A1 * | 5/2012 | Ohashi | 455/501 |
| 2012/0158249 | A1 * | 6/2012 | Xu et al. | 701/45 |
| 2012/0208517 | A1 | 8/2012 | Zohar | |
| 2012/0282885 | A1 * | 11/2012 | Hamed et al. | 455/404.2 |
| 2013/0130639 | A1 * | 5/2013 | Oesterling et al. | 455/404.1 |
| 2013/0253775 | A1 * | 9/2013 | Shimizu | 701/45 |
| 2014/0179348 | A1 | 6/2014 | Simon | |
| 2014/0179353 | A1 | 6/2014 | Simon | |
| 2014/0180563 | A1 | 6/2014 | Simon | |
| 2014/0180615 | A1 | 6/2014 | Simon | |

FOREIGN PATENT DOCUMENTS

| | | | |
|---|---|---|---|
| JP | 2007-183865 | A | 7/2007 |
| JP | 2009-177758 | A | 8/2009 |
| WO | WO 03-095276 | A1 | 11/2003 |

OTHER PUBLICATIONS

PCT/US2013/076410 International Search Report and Written Opinion, Apr. 7, 2014, Song, Ho Keun.

PCT/US2013/076426 International Search Report and Written Opinion, Apr. 9, 2014, Ham, Joung Hyun.

PCT/US2013/076440 International Search Report and Written Opinion, Apr. 9, 2014, Sohn, Byoung Cheol.

* cited by examiner

SYSTEM AND METHOD FOR DETECTING VEHICLE CRASH

The present application claims priority from: U.S. Provisional Application No. 61/740,814 filed Dec. 21, 2012; U.S. Provisional Application No. 61/740,831 filed Dec. 21, 2012; U.S. Provisional Application No. 61,740,851 filed Dec. 21, 2012; and U.S. Provisional Application No. 61/745,677 filed Dec. 24, 2012, the entire disclosures of which are incorporated herein by reference. The present application is a continuation-in-part of U.S. application Ser. No. 14/072,231 filed Nov. 5, 2013, and is a continuation-in-part of U.S. application Ser. No. 14/095,156 filed Dec. 3, 2013, the entire disclosures of which are incorporated herein by reference.

BACKGROUND

Vehicle telematics is the technology of sending, receiving and storing information to and from vehicles and is generally present (at least to a limited extent) in the automotive marketplace today. For example, both General Motors (through their OnStar offering) and Mercedes Benz (through their Tele-Aid and more recent mbrace system offering) have long offered connected-vehicle functionality to their customers. Both of these offerings make use of the data available on a vehicle's CAN bus, which is specified in the OBD-II vehicle diagnostics standard. For example, the deployment of an airbag, which suggests that the vehicle has been involved in a crash, may be detected by monitoring the CAN bus. In this event, a digital wireless telephony module that is embedded in the vehicle and connected to the vehicle's audio system (i.e., having voice connectivity) can initiate a phone call to a telematics service provider (TSP) to "report" the crash. Vehicle location may also be provided to the TSP using the vehicle's GPS functionality. Once the call is established, the TSP representative may attempt to communicate with the vehicle driver, using the vehicle's audio system, to assess the severity of the situation. Assistance may thus be dispatched by the TSP representative to the vehicle as appropriate.

Historically, these services were focused entirely on driver and passenger safety. These types of services have expanded since their initial roll-out, however, and now offer additional features to the driver, such as concierge services. The services, however, remain mainly focused on voice based driver to call center communication, with data services being only slowly introduced, hindered by low bandwidth communication modules, high cost and only partial availability on some model lines.

As a result, while generally functional, vehicle telematics services have experienced only limited commercial acceptance in the marketplace. There are several reasons for this. In addition to low speeds and bandwidth, most vehicle drivers (perhaps excluding the premium automotive market niche) are reluctant to pay extra for vehicle telematics services, either in the form of an upfront payment (i.e., more expensive vehicle) or a recurring (monthly/yearly) service fee. Moreover, from the vehicle manufacturer's perspective, the services require additional hardware to be embedded into the vehicle, resulting in extra costs on the order of $250 to $350 or more per vehicle which cannot be recouped. Thus, manufacturers have been slow to fully commit to or invest in the provision of vehicle telematics equipment in all vehicles.

There have been rudimentary attempts in the past to determine when a smartphone is in a moving vehicle. Wireless service provider AT&T, Sprint and Verizon, for example, offer a smartphone application that reacts in a specific manner to incoming text messages and voice calls when a phone is in what AT&T calls DriveMode™. With the AT&T DriveMode application, a wireless telephone is considered to be in "drive mode" when one of two conditions are met. First, the smartphone operator can manually turn on the application, i.e., she "tells" the application to enter drive mode. Alternatively, when the DriveMode application is in automatic on/off mode and the smartphone GPS sensor senses that the smartphone is travelling at greater than 25 miles per hour, the GPS sensor so informs the DriveMode application, the DriveMode application concludes that the smartphone is in a moving vehicle, and drive mode is entered.

Both of these paths to engaging the AT&T DriveMode application—the "manual" approach to entering drive mode and the "automatic" approach to entering drive mode—are problematic. First, if the smartphone operator forgets or simply chooses not to launch the DriveMode application prior to driving the vehicle when the application is in manual mode then the application will not launch. Second, in automatic on/off mode AT&T's use of only the GPS sensor to determine when a smartphone is in a moving vehicle is problematic for a number of reasons. First, the speed threshold of the application is arbitrary, meaning that drive mode will not be detected/engaged at less than 25 mph. If the vehicle is stopped in traffic or at a traffic signal, for example, then the DriveMode application may inadvertently terminate. Second, and perhaps more importantly, AT&T's DriveMode application requires that the smartphone's GPS functionality be turned on at all times. Because the use of a smartphone's GPS sensor is extremely demanding to the battery resources of a smartphone, this requirement severely undermines the usefulness of AT&T's application. Thirdly this method does not differentiate between the type of vehicle that the phone is in, e.g. a bus, a taxi or a train and therefore allows no correlation between the owner of the phone and her driving situation. For the classic embedded telematics devices to be replaces by smartphones it is important to correlate the driver and smartphone owner with her personal vehicle. Only then the smartphone can truly take the functional role of an embedded telematics device in a vehicle.

The main justification premise for a connected embedded device is the ability to not only detect an accident, but to autonomously call for help to either a privately operated emergency response center or 911. In fact, this safety function has been the main driver behind the last fifteen years of installing embedded communication devices in vehicles through major vehicle manufacturers. What is needed is a delivery of such a safety functionality without the need for any embedded device, thus allowing millions of drivers the safety benefit of automatic crash notification without the need for an expensive embedded device and a costly subscription. What is needed is an improved method and apparatus of determining, via a communication device, whether a vehicle has crashed.

SUMMARY

The present invention provides an improved method and apparatus of determining, via a communication device, whether a vehicle has crashed.

Various embodiments described herein are drawn to a device for use with a vehicle. The device includes a mode-determining component, a first detecting component and a second detecting component. The mode-determining component can generate an in-vehicle signal. The first detecting component can detect a first parameter and can generate a first detector signal based on the first detected parameter. The second detecting component can detect a second parameter and can generate a second detector signal based on the second detected parameter. The mode-determining component can further generate a crash mode signal based on the in-vehicle signal, the first detector signal and the second detector signal.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1A:
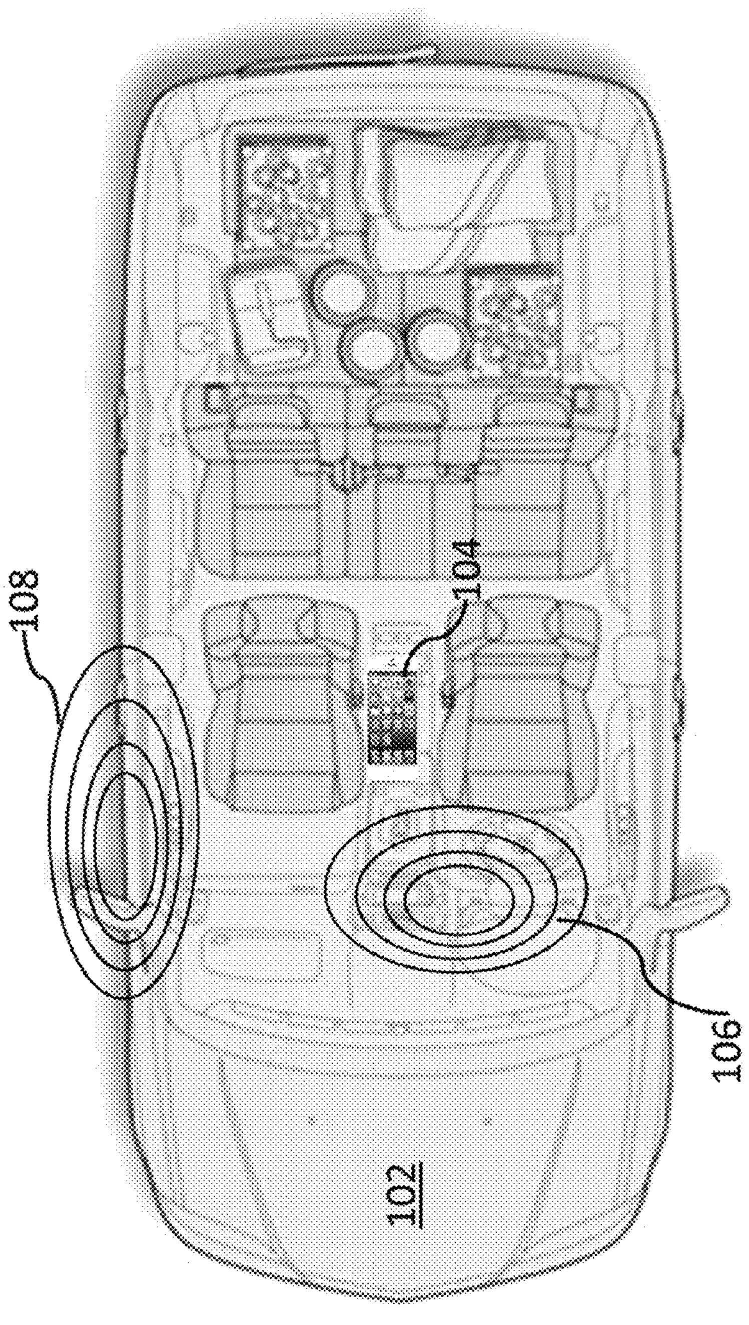
FIGS. 1A-B are planar views of an interior of a vehicle at a times $t_0$ and $t_1$, respectively.

Aspects of the present invention are drawn to a system and method for detecting a vehicle crash.

As used herein, the term "smartphone" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or other devices that can include a radio frequency transceiver and a pager, Internet/Intranet access, Web browser, organizer, calendar and/or a global positioning system (GPS) receiver; and/or conventional laptop (notebook) and/or palmtop (netbook) computer(s), tablet(s), or other appliance(s), which include a radio frequency transceiver. As used herein, the term "smartphone" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more location(s).

Some conventional communication devices may detect a vehicle crash, and then switch to operate in a "crash mode." While in a crash mode, some functionalities of the communication device may be activated whereas other functionalities may be deactivated. For example, in a crash mode, a communication device may automatically contact emergency services and provide geodetic location information such that the emergency services can respond to the vehicle crash.

Conventional communication devices may detect a vehicle crash by way of monitoring a single parameter. In one example of a conventional communication device, a vehicle crash may be detected by monitoring declaration. If a rapid deceleration is detected, and which corresponds to a previously known deceleration or family of decelerations associated with a vehicle crashing, the communication device may determine that a vehicle has been in a crash. However, such a conventional system may detect a vehicle crash when there in fact has not been a vehicle crash, i.e., results in a false-positive. This situation may occur for example if the communication device itself is dropped by the user, and the rapid deceleration of the communication device hitting the ground emulates a rapid deceleration associated with a vehicle crash.

In another example of a conventional communication device, a vehicle crash may be detected by monitoring vibrations of the chassis of the vehicle associated with deployment of an airbag. If a vibration is detected, and which corresponds to a previously known vibration or family of vibrations associated with the deployment of an airbag in a vehicle, the communication device may determine that a vehicle has been in a crash. However, such a conventional system may detect a vehicle crash when there in fact is not been vehicle crash, i.e., results in a false-positive. This situation may occur for example if the communication device is near some other event, that is not a vehicle crash, but that emulates the vibrations associated with the deployment of an airbag.

In another example of a conventional communication device, a vehicle crash may be detected by monitoring an on-board diagnostic (OBD) system. For example, the OBD may monitor whether the airbag has been deployed, or whether there has been a rapid deceleration followed by a total stoppage (zero measured velocity). However, if the OBD is not connected directly connected to a communication device when the vehicle crashes, then information relating to the vehicle crash as detected by the OBD cannot be easily and quickly relayed outside of the vehicle, e.g. to emergency services.

Aspects of the present invention reduce the likelihood of obtaining a false-positive determination of a vehicle crash without connecting to an OBD. In accordance with aspects of the present invention a vehicle crash may be identified by a communication device, e.g., a smartphone, within the vehicle at the time of the vehicle crash. First, the communication device determines whether it is located in a vehicle. This first determination will greatly decrease the number of false-positive vehicle crash detections. Then the communication device will detect at least two parameters associated with a vehicle crash. If, once in the vehicle, the communication device detects values of at least two parameters that correspond to known values of known parameters associated with a vehicle crash, it may determine that the vehicle has been in a crash. The detection of at least two parameters further decreases the number of false-positive vehicle crash detections.

These aspects will now be described in more detail with reference to FIGS. 1A-4.

FIG. 1A is a planar view of an interior of a vehicle 102 at a time $t_0$. A position 104 represents the location of a smartphone within vehicle 102. A superposition of magnetic fields at position 104 is represented by field lines 106. A superposition of sound at position 104 is represented by lines 108. Again, in accordance with aspects of the present invention, parameters such as magnetic fields at position 104 and sound at position 104 may be detected by a communication device of person in vehicle 102 in order to detect a crash of vehicle 102. The mode of operation of the communication device may be set to vehicle mode, by any known method.

For purposes of discussion, consider the situation at some point in time $t_1$ after time $t_0$, wherein vehicle 102 crashes. This will now be described with further reference to FIG. 1B.

Figure 1B:
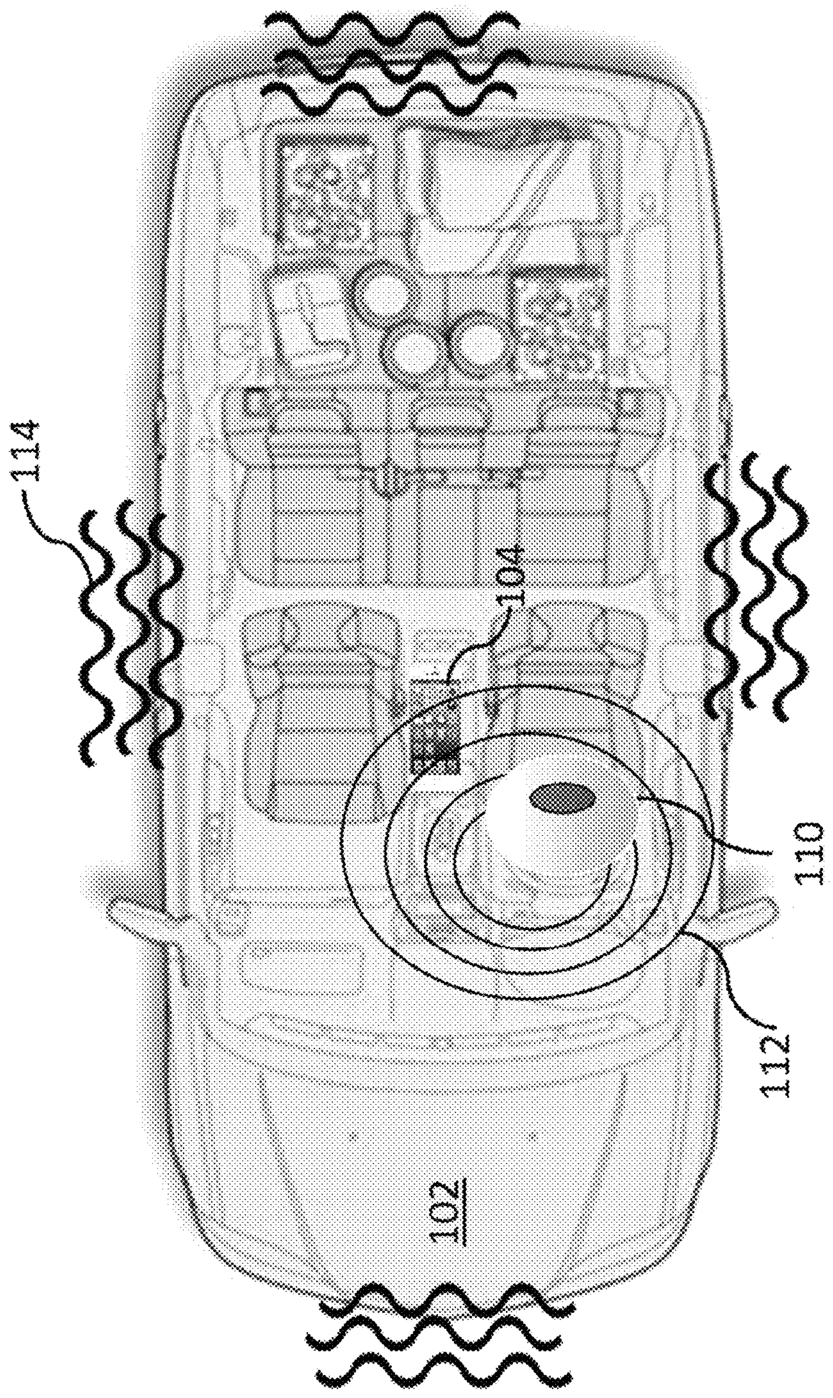

FIG. 1B is a planar view of an interior of a vehicle 102 at a time $t_1$. A position 104 represents the location of a smartphone within vehicle 102. In this figure, an airbag 110 has deployed as a result of vehicle 102 crashing. Deployment of airbag 110 generates a specific magnetic field as represented by field lines 112. Further, deployment of airbag 110 generates a shockwave (specific vibrations) that travels throughout the chassis of vehicle 102 as represented by the wavy lines, a sample of which is indicated as wavy lines 114. In accordance with aspects of the present invention, a communication device may be able to detect the crash of vehicle 102 based on being in the vehicle mode and based on detecting two parameters, in this example vibrations and a magnetic field associated with deployment of airbag 110.

An example system and method for detecting a vehicle crash in accordance with aspects of the present invention will now be described with additional reference to FIGS. 2-4.

Figure 2:
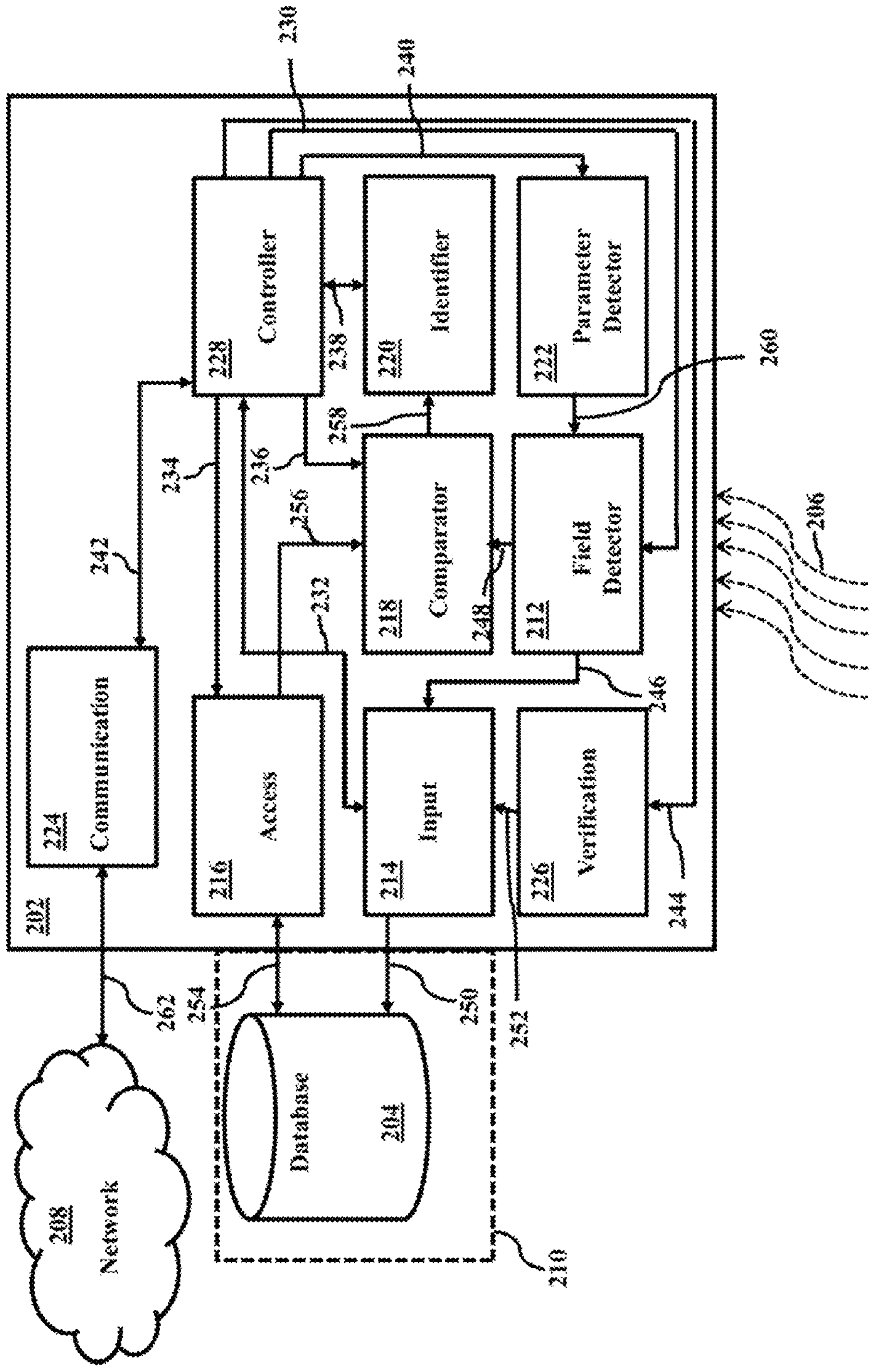
FIG. 2 illustrates an example device for detecting a crash in accordance with aspects of the present invention.

FIG. 2 illustrates an example device 202 in accordance with aspects of the present invention.

FIG. 2 includes a device 202, a database 204, a field 206 and a network 208. In this example embodiment, device 202 and database 204 are distinct elements. However, in some embodiments, device 202 and database 204 may be a unitary device as indicated by dotted line 210.

Device 202 includes a field-detecting component 212, an input component 214, an accessing component 216, a comparing component 218, an identifying component 220, a parameter-detecting component 222, a communication component 224, a verification component 226 and a controlling component 228.

In this example, field-detecting component 212, input component 214, accessing component 216, comparing component 218, identifying component 220, parameter-detecting component 222, communication component 224, verification component 226 and controlling component 228 are illustrated as individual devices. However, in some embodiments, at least two of field-detecting component 212, input component 214, accessing component 216, comparing component 218, identifying component 220, parameter-detecting component 222, communication component 224, verification component 226 and controlling component 228 may be combined as a unitary device. Further, in some embodiments, at least one of field-detecting component 212, input component 214, accessing component 216, comparing component 218, identifying component 220, parameter-detecting component 222, communication component 224, verification component 226 and controlling component 228 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Controlling component 228 is configured to communicate with: field-detecting component 212 via a communication line 230; input component 214 via a communication line 232; accessing component 216 via a communication line 234; comparing component 218 via a communication line 236, identifying component 220 via a communication line 238; parameter-detecting component 222 via a communication line 240; communication component 224 via a communication line 242; and verification component 226 via a communication line 244. Controlling component 228 is operable to control each of field-detecting component 212, input component 214, accessing component 216, comparing component 218, identifying component 220, parameter-detecting component 222, communication component 224 and verification component 226.

Field-detecting component 212 is additionally configured to detect field 206, to communicate with input component 214 via a communication line 246 and to communicate with comparing component 218 via a communication line 248. Field-detecting component 212 may be any known device or system that is operable to detect a field, non-limiting examples of which include an electric field, a magnetic field, and electromagnetic field and combinations thereof. In some non-limiting example embodiments, field-detecting component 212 may detect an amplitude of a field at an instant of time. In some non-limiting example embodiments, field-detecting component 212 may detect a field vector at an instant of time. In some non-limiting example embodiments, field-detecting component 212 may detect an amplitude of a field as a function over a period of time. In some non-limiting example embodiments, field-detecting component 212 may detect a field vector as a function over a period of time. In some non-limiting example embodiments, field-detecting component 212 may detect a change in the amplitude of a field as a function over a period of time. In some non-limiting example embodiments, field-detecting component 212 may detect a change in a field vector as a function over a period of time. Field-detecting component 212 is additionally able to generate a field signal based on the detected field.

Input component 214 is additionally configured to communicate with database 204 via a communication line 250 and to communicate with verification component 226 via a communication line 252. Input component 214 may be any known device or system that is operable to input data into database 204. Non-limiting examples of input component 214 include a graphic user interface having a user interactive touch screen or keypad.

Accessing component 216 is additionally configured to communicate with database 204 via a communication line 254 and to communicate with comparing component 218 via a communication line 256. Accessing component 216 may be any known device or system that access data from database 204.

Comparing component 218 is additionally configured to communicate with identifying component 220 via a communication line 258. Comparing component 218 may be any known device or system that is operable to compare two inputs.

Parameter-detecting component 222 is additionally configured to communicate with field-detecting component 212 via a communication line 260. Parameter-detecting component 222 may be any known device or system that is operable to detect a parameter, non-limiting examples of which include velocity, acceleration, geodetic position, sound, temperature, vibrations, pressure, contents of surrounding atmosphere and combinations thereof. In some non-limiting example embodiments, parameter-detecting component 222 may detect an amplitude of a parameter at an instant of time. In some non-limiting example embodiments, parameter-detecting component 222 may detect a parameter vector at an instant of time. In some non-limiting example embodiments, parameter-detecting component 222 may detect an amplitude of a parameter as a function over a period of time. In some non-limiting example embodiments, parameter-detecting component 222 may detect a parameter vector as a function over a period of time. In some non-limiting example embodiments, parameter-detecting component 222 may detect a change in the amplitude of a parameter as a function over a period of time. In some non-limiting example embodiments, parameter-detecting component 222 may detect a change in a parameter vector as a function over a period of time.

Communication component 224 is additionally configured to communicate with network 208 via a communication line 262. Communication component 224 may be any known device or system that is operable to communicate with network 208. Non-limiting examples of communication component include a wired and a wireless transmitter/receiver.

Verification component 226 may be any known device or system that is operable to provide a request for verification. Non-limiting examples of verification component 226 include a graphic user interface having a user interactive touch screen or keypad.

Communication lines 230, 232, 234, 236, 238, 240, 242, 244, 244, 246, 248, 250, 252, 254, 256, 258, 260 and 262 may be any known wired or wireless communication path or media by which one component may communicate with another component.

Database 204 may be any known device or system that is operable to receive, store, organize and provide (upon a request) data, wherein the "database" refers to the data itself and supporting data structures. Non-limiting examples of database 204 include a memory hard-drive and a semiconductor memory.

Network 208 may be any known linkage of two or more communication devices. Non-limiting examples of database 208 include a wide-area network, a local-area network and the Internet.

Figure 3:
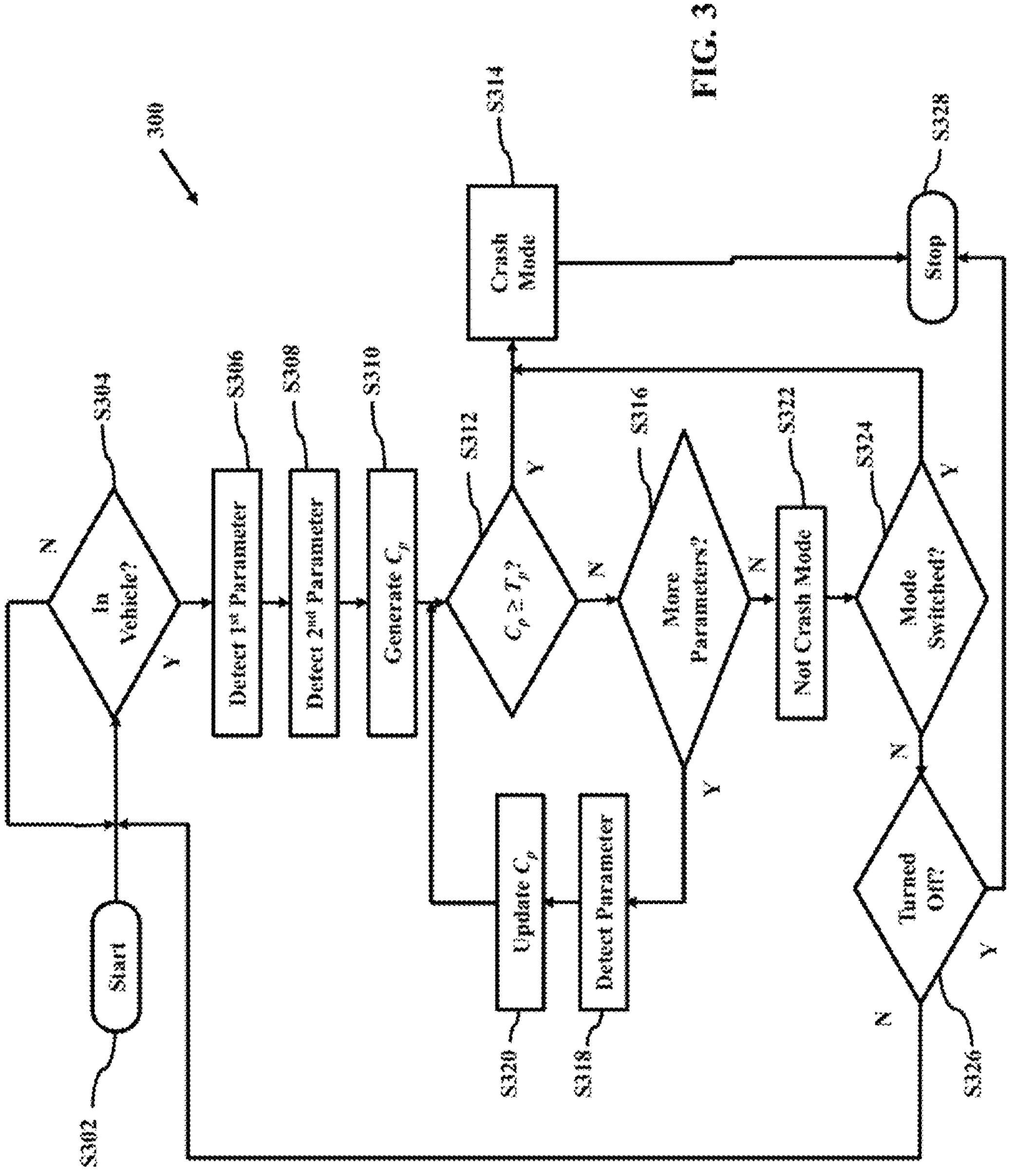
FIG. 3 illustrates an example method of detecting a vehicle crash in accordance with aspects of the present invention.

FIG. 3 illustrates an example method 300 of detecting a vehicle crash in accordance with aspects of the present invention.

Method 300 starts (S302) and it is determined whether the device is in a vehicle (S304). For example, returning to FIGS. 1A-2, device 202 may determine that it is in vehicle 102 by any known method, non-limiting examples of which include detecting parameters and comparing the detected parameters with those associated with vehicle 102. Non-limiting examples of known parameters include magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof.

In an example embodiment, device 202 determines whether it is in a vehicle and as described in copending U.S. application Ser. No. 14/095,156 filed Dec. 3, 2013. For example, device 202 may detect at least one of many parameters. Database 204 may have stored therein known parameters values that are indicative of being in a vehicle. Comparing component may compare signals based on the detected parameters with a previously stored signature corresponding to a vehicle in database 204. Identifying component 220 may generate an in-vehicle signal indicating that device is in a vehicle based on the comparison by comparing component 218.

If it is determined that device 202 is not in a vehicle (N at S304), then method 300 may continue waiting for such a state (return to S304).

On the other hand, if it is determined that device 202 is in a vehicle (Y at S304), then a first parameter is detected (S306). For example, returning to FIG. 2, let the parameter be a field, wherein field-detecting component 212 detects field 206. For purposes of discussion, let field 206 include a magnetic field generated by the deployment of an airbag in response to the vehicle being involved with a crash, as discussed above with reference to FIG. 1B. This is a non-limiting example, wherein the detected parameter may be any known detectable parameter, of which other non-limiting examples include magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof.

Returning to FIG. 3, after the first parameter is detected (S306), a second parameter is detected (S308). For example, returning to FIG. 2, controlling component 228 may instruct at least one of field-detecting component 212 and parameter-detecting component 222 to detect another parameter. This is similar to method 300 (S308) discussed above with reference to FIG. 3.

For example, returning to FIG. 2, controlling component 228 may instruct at least one of field-detecting component 212 and parameter-detecting component 222 to detect another parameter.

A magnetic field associated with the deployment of an airbag may be a relatively distinct parameter that may be used to determine whether a vehicle, of which the communication device is located, has been in a crash. However, there may be situations that elicit a false positive—e.g., a magnetic field that erroneously indicates that an airbag has been deployed and indicating a vehicle crash is actually a magnetic field associated with the operation of an automatic seat positioner within the vehicle, which has not been in a crash. As such, in order to reduce the probability of a false-positive indication that the vehicle has been in a crash, a second parameter associated with a vehicle crash may be used. Along this notion, it is an example aspect of the invention to detect a plurality of parameters associated with a vehicle crash to increase the probability of a correct identification of a vehicle crash.

In some embodiments, device 202 has a predetermined number of parameters to detect, wherein controlling component 228 may control such detections. For example, the first parameter to be detected (in S306) may be a magnetic field associated with the deployment of an airbag, wherein controlling component 228 may instruct field-detecting component 212 to detect a magnetic field. Further, a second parameter to be detected may be another known detected parameter additionally associated with a vehicle crash, e.g., deceleration in three dimensions, wherein controlling component 228 may instruct parameter-detecting component 222 to detect the second parameter. Further parameter-detecting component 222 may be able to detect many parameters. This will be described with greater detail with reference to FIG. 4.

Figure 4:
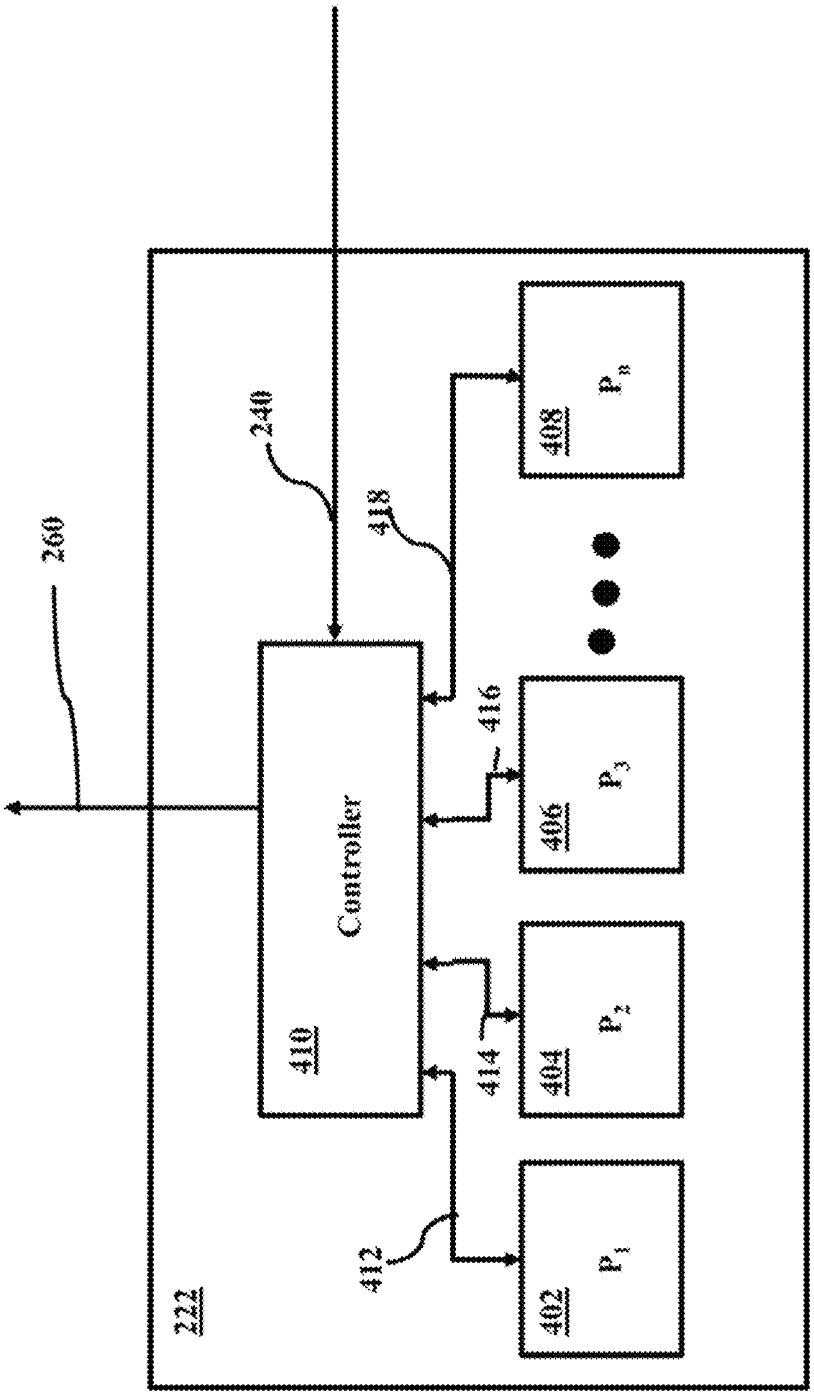
FIG. 4 illustrates an example parameter-detecting component in accordance with aspects of the present invention.

FIG. 4 illustrates an example parameter-detecting component 222.

As shown in the figure, parameter-detecting component 222 includes a plurality of detecting components, a sample of which are indicated as a first detecting component 402, a second detecting component 404, a third detecting component 406 and an n-th detecting component 408. Parameter-detecting component 222 additionally includes a controlling component 410.

In this example, detecting component 402, detecting component 404, detecting component 406, detecting component 408 and controlling component 410 are illustrated as individual devices. However, in some embodiments, at least two of detecting component 402, detecting component 404, detecting component 406, detecting component 408 and controlling component 410 may be combined as a unitary device. Further, in some embodiments, at least one of detecting component 402, detecting component 404, detecting component 406, detecting component 408 and controlling component 410 may be implemented as a computer having tangible computer-readable media for carrying or having computer-executable instructions or data structures stored thereon.

Controlling component 410 is configured to communicate with: detecting component 402 via a communication line 412; detecting component 404 via a communication line 414; detecting component 406 via a communication line 416; and detecting component 408 via a communication line 418. Controlling component 410 is operable to control each of detecting component 402, detecting component 404, detecting component 406 and detecting component 408. Controlling component 410 is additionally configured to communicate with controlling component 228 of FIG. 2 via communication line 240 and to communicate with field-detecting component 212 of FIG. 2 via communication line 260.

The detecting components may each be a known detecting component that is able to detect a known parameter. For example each detecting component may be a known type of detector that is able to detect at least one of magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof. For purposes of discussion, let: detecting component 402 be able to detect deceleration in three dimensions; detecting component 404 be able to detect sound; detecting component 406 be able to detect vibrations; and detecting component 408 be able to detect geodetic position.

In some non-limiting example embodiments, at least one of the detecting components of parameter-detecting component 222 may detect a respective parameter as an amplitude at an instant of time. In some non-limiting example embodiments, at least one of the detecting components of parameter-detecting component 222 may detect a respective parameter as a function over a period of time.

Each of the detecting components of parameter-detecting component 222 is able to generate a respective detected signal based on the detected parameter. Each of these detected signals may be provided to controlling component 410 via a respective communication line.

Controlling component 410 is able to be controlled by controlling component 228 via communication line 240.

Consider the example situation where communication device 202 generates a signature of a vehicle crash, wherein field detecting component 212 detects a magnetic field associated with deployment of an airbag as discussed above with reference to FIG. 1B, wherein detecting component 402 detects roll, pitch and yaw associated with movement of the communication device 202 during the vehicle crash and wherein detecting component 406 detects vibrations associated with a shockwave traveling through the chassis of the vehicle as a result of the deployment of the airbag as discussed above with reference to FIG. 1B. This will be further described with reference to FIG. 5.

Figure 5:
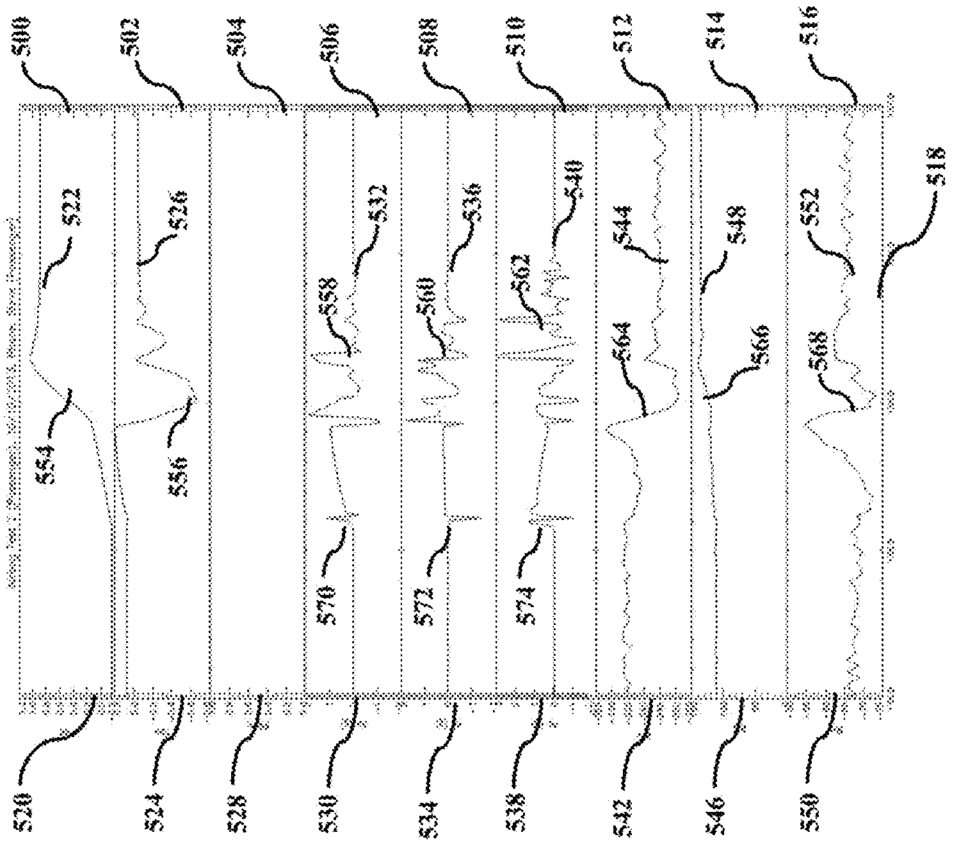
FIG. 5 illustrates a plurality of example functions corresponding to parameters detected by an example device in accordance with aspects of the present invention.

FIG. 5 includes a graph 500, a graph 502, a graph 504, a graph 506, a graph 508, a graph 510, a graph 512, a graph 514, and a graph 516, each of which share a common x-axis 518 in units of seconds. Graph 500 has a y-axis 520 in units of degrees and includes a function 522. Graph 502 has a y-axis 524 in units of degrees and includes a function 526. Graph 504 has a y-axis 528 in units of degrees and has no function therein. Graph 506 has a y-axis 530 in units of $m/s^2$, and includes a function 532. Graph 508 has a y-axis 534 in units of $m/s^2$ and includes a function 536. Graph 510 has a y-axis 538 in units of $m/s^2$ and includes a function 540. Graph 512 has a y-axis 542 in units of μT and includes a function 544. Graph 514 has a y-axis 546 in units of μT and includes a function 548. Graph 516 has a y-axis 550 in units of μT and includes a function 552.

Function 522 corresponds to the angular acceleration in a roll direction relative to parameter-detecting component 222. Function 526 corresponds to the angular acceleration in a yaw direction relative to parameter-detecting component 222. As there is no recorded function that corresponds to the angular acceleration in a pitch direction relative to parameter-detecting component 222, in this example, no angular acceleration in a pitch direction relative to parameter-detecting component 222 was detected. Function 532 corresponds to the acceleration in an x-direction relative to parameter-detecting component 222. Function 536 corresponds to the acceleration in a y-direction relative to parameter-detecting component 222. Function 540 corresponds to the acceleration in a z-direction relative to parameter-detecting component 222. Function 544 corresponds to the magnitude of B in an x-direction relative to field-detecting component 212. Function 548 corresponds to the magnitude of B in a y-direction relative to field-detecting component 212. Function 552 corresponds to the magnitude of B in a z-direction relative to field-detecting component 212.

A sudden change in the roll manifests as curve 554 in function 522. A sudden change in the yaw manifests as transient 556 in function 526. A sudden change in acceleration manifests as transient 558 in function 532, as transient 560 in function 536 and as transient 562 in function 540. A sudden change in the magnetic field manifests as transient 564 in function 544, as small change 566 in function 548 and as transient 568 in function 552. These changes and transients in functions 522, 526, 532, 536, 540, 544, 548 and 552 may be indicative of an event.

For purposes of discussion, let these changes and transients in functions 522, 526, 532, 536, 540, 544, 548 and 552 correspond to communication device 202 changing position as a result of a vehicle crash. Specifically, let curve 554 in function 522 transient 556 in function 526 correspond to a sudden change in position of communication device 202 when the vehicle crashes. Further, let transient 558 in function 532, transient 560 in function 536 and transient 562 in function 540 correspond to a shockwave within the chassis associated with deployment of the airbag when the vehicle crashes. Finally, let transient 564 in function 544, change 566 in function 548 and transient 568 in function 552 correspond to a magnetic field associated with deployment of the airbag when the vehicle crashes.

In this example, spike 570 in function 532, spike 572 in function 536 and spike 574 in function 540 correspond to the dropping of communication device into position to start the crash test of the vehicle.

In this example therefore, the vehicle crash may have a signature based on functions 522, 526, 532, 536, 540, 544, 548 and 552, having tell-tail changes and transients 554, 556, 558, 560, 562, 564, 566 and 568, respectively. In some embodiments, field-detecting component 212 may additionally process any of functions 522, 526, 532, 536, 540, 544, 548 and 552 and combinations thereof to generate such a signature. Non-limiting examples of further processes include averaging, adding, subtracting, and transforming any of functions 612, 614, 616, 618 and combinations thereof.

Returning to FIG. 3, after the first two parameters are detected (S306 and S308), a crash probability. $C_p$, is generated (S310). For example, first a previously-stored signature (or signatures) may be retrieved, which is based on parameters associated with a vehicle crash. Then a crash signature is generated based on the detected parameters. Then the crash signature is compared with the previously-stored signature (or signatures), wherein the comparison is used to generate the crash probability $C_p$. The crash probability $C_p$ is a value that indicates the likelihood that the vehicle has crashed based on the similarity of the previously-stored signature and the newly-generated signature. In essence, it is determined whether the previously detected parameters associated with a previous vehicle crash (or previous vehicle crashes) are similar to the newly detected parameters.

In an example embodiment, the previously-stored signature may be stored in database 204. A crash signature may be created by any known system or method and may be based detected parameters associated with previously recorded crashes. For example, crash signatures may be created based on previously recorded crashes from controlled crashes in a testing environment, i.e., test-crashes, and uncontrolled crashes, e.g., automobile accidents.

In some example embodiments, a plurality of crash signatures are stored in database 204, wherein each crash signature is associated with a particular make, model and year vehicle. These crash signatures may be generated from previously recorded crashes from controlled crashes and uncontrolled crashes.

In some example embodiments, a plurality of crash signatures are stored in database 204, wherein each crash signature is associated with many different makes, models and years of vehicles. These crash signatures may be generated from previously recorded crashes from controlled crashes and uncontrolled crashes.

In some example embodiments, a plurality of crash signatures are stored in database 204, wherein each crash signature is associated with a particular type of vehicle crash, e.g., front, rear or side. These crash signatures may be generated from previously recorded crashes from controlled crashes and uncontrolled crashes.

In some example embodiments, a plurality of crash signatures are stored in database 204, wherein each crash signature is associated with a combination of: many different makes, models and years of vehicle and with a particular type of vehicle crash, e.g., front, rear or side. These crash signatures may be generated from previously recorded crashes from controlled crashes and uncontrolled crashes.

Non-limiting examples of detected parameters for which each crash signature is based include at least one of magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof.

As for how a crash signature is generated, in some embodiments it is a signal output from a detecting component that is capable of detecting a parameter. A crash signature may be a composite detected signal that is based on any of an individual detected signal, and combination of a plurality of detected signals. In some embodiments, any of the individual detected signals and combinations thereof may be additionally processed to generate a crash. Non-limiting examples of further processes include averaging, adding, subtracting, and transforming any of the individual detected signals and combinations thereof. For purposes of discussion, consider the situation where a vehicle is crash-tested and parameters are detected to generate a crash signature. In this example, let the crash signature be based on: a detected magnetic field associated with deployment of the airbag during the crash; a detected deceleration in three dimensions during the crash; a detected sound during the crash; and detected vibrations during the crash. Further, in this example, let the crash signature be the five separate signals, such that future comparisons with other crash signatures will compare signals of similar parameters.

Returning to FIG. 2, previously stored crash signatures are stored in database 204 as a priori information.

Controlling component 228 may then instruct access component 216 to retrieve a previously-stored signature, from database 204 and to provide the previously-stored signature to comparing component 218. In some embodiments, a single previously-stored signature is retrieved, wherein in other embodiments, more than one previously-stored signature may be received.

Controlling component 228 may then instruct comparing component 218 to generate a crash probability, $C_p$, indicating a probability that the vehicle crashed.

In embodiments where a single previously-stored signature is retrieved, the newly generated signature may be compared with the single previously-stored signature. The crash probability $C_p$ may then be generated based on the similarity between the newly generated signature and the single previously-stored signature.

In some embodiments where plural previously-stored signatures are retrieved, the newly generated signature may be compared each previously-stored signature in a serial manner. The crash probability $C_p$ may then be generated based on the similarity between the newly generated signature and the single previously-stored signature of which is most similar to the newly generated signature.

In some embodiments where plural previously-stored signatures are retrieved, the newly generated signature may be compared each previously-stored signature in a parallel manner. The crash probability $C_p$ may then be generated based on the similarity between the newly generated signature and the single previously-stored signature of which is most similar to the newly generated signature.

In an example embodiment, the newly generated signature is compared with a single previously-stored signature. If the newly generated signature is exactly the same as the previously-stored signature, then the generated crash probability will be 1, thus indicating that the vehicle has crashed. Variations between the newly generated signature and the previously-stored signature will decrease the generated crash probability, thus decreasing the likelihood that the vehicle has crashed. Any known method of comparing two signatures to generate such a probability may be used.

In an example embodiment, a comparison is made between similar parameter signals. For example, let a previously-stored signature be a function corresponding to a previously-detected magnetic field and a second function corresponding to a previously-detected deceleration in three dimensions, and let a newly-detected signature be a function corresponding to a newly-detected magnetic field and a second function corresponding to a newly-detected deceleration in three dimensions. The comparison would include a comparison of the function corresponding to the previously-detected magnetic field and the function corresponding to the newly-detected magnetic field and a comparison of the second function corresponding to a previously-detected deceleration in three dimensions and the second function corresponding to a newly-detected deceleration in three dimensions.

Controlling component 228 may then provide the crash probability $C_p$ to identifying component 220 via communication line 258.

Returning to FIG. 3, it is then determined whether the generated crash probability $C_p$ is greater than or equal to a predetermined probability threshold, $T_p$ (S312). For example, identifying component 220 may have a predetermined probability threshold $T_p$ stored therein. The probability threshold $T_p$ may be established to take into account acceptable variations in detected parameters. For example, all vehicles may have varying unique parameter signatures, e.g., magnetic signatures, thermal signatures, acoustic signatures, etc. However, the corresponding parameter signatures of all vehicles in a crash may be considered somewhat similar. These similarities may be taken into account when setting the probability threshold $T_p$.

Clearly, if the probability threshold $T_p$ is set to 1, this would only be met if newly generated signature is exactly the same as the previously-stored signature (or one of the previously stored signatures), thus indicating that the vehicle has crashed. Further, this threshold would not be met if the sensors did not detect the exact parameters, which does not generally represent a real world scenario. On the contrary, if the probability threshold $T_p$ is decreased, it would take into account variations in the detected parameters. Further, if the probability threshold $T_p$ is decreased further, it may take into account variations in a class of vehicle crashes, e.g., difference vehicles, or crashes from various angles.

In an example embodiment, identifying component 220 determines whether the crash probability $C_p$ generated by comparing component 218 is greater than or equal to the predetermined probability threshold $T_p$. In this case, identifying component 220 is a probability-assessing component that generates a probability of a specific mode based on a comparison or comparison signal.

Returning to FIG. 3, if it is determined that the generated crash probability is greater than or equal to the predetermined probability threshold (Y at S312), then the device is operated in a crash mode (S314). For example, consider the situation where a person carrying device 202 is driving in vehicle 102, which crashes. Identifying component 220 has determined that the newly detected signature associated with the detected parameters from the crash matches a previously-stored signature for a vehicle crash. In such a case, identifying component 220 provides a crash mode signal to controlling component 228, via communication line 238, indicating device 202 should operate in a crash mode. Further, for purposes of discussion, let the crash mode be such a mode wherein predetermined functions of device 202 may be activated, such as automatically contacting emergency services.

In this situation, identifying component 220 acts as a mode-determining component and has generated an in-vehicle signal indicating that device 202 is in a vehicle. Further field-detecting component 212 has generated a detector signal based on a first detected parameter, in this example, a detected magnetic field associated with the deployment of an airbag. Additionally, parameter-detecting component 222 has generated a detector signal based on a second detected parameter, in this example, a detected deceleration. Finally, identifying component 220 generates the crash mode signal based on the in-vehicle signal, the signal based on the first parameter and the signal based on the second parameter. Having the crash mode signal being based on the in-vehicle signal, and both detector signals greatly decreases the chances of false-positive identifications of a vehicle crash. Further, this system is able to generate an accurate crash mode signal without accessing the OBD.

Returning to FIG. 3, once the device is operated in the crash mode (S314), method 300 stops (S328).

If it is determined that the generated crash probability is less than the predetermined probability threshold (N at S312), it is determine whether an additional parameter is to be detected (S316). For example, returning to FIG. 3, as discussed previously, parameter-detecting component 222 may be able to detect a plurality of parameters. In some embodiments, all parameters are detected at once, whereas in other embodiments some parameters are detected at different times.

Consider the situation where an initially generated crash probability is based only on a newly-detected magnetic field as detected by field-detecting component 212 and on a newly-detected deceleration in three dimensions as detected by detecting component 302. Further, for purposes of discussion, let the generated crash probability be less than the predetermined probability threshold. In such a case, if more parameters had been detected, they may be used to further indicate that the vehicle has crashed.

Returning to FIG. 3, if an additional parameter is to be detected (Y at S316), then an additional parameter is detected (S318). For example, controlling component 228 may instruct parameter-detecting component 222 to provide additional information based on additionally detected parameters to field-detecting component 212.

Returning to FIG. 3, after the additional parameter is detected (S318), the crash probability is updated (S320). For example, the new signature may be generated in a manner similar to the manner discussed above in method 300 (S310) of FIG. 3. Controlling component 228 may then instruct access component 216 to retrieve the previously-stored signature, e.g., from method 300 of FIG. 3, from database 204 and to provide the previously-stored signature to comparing component 218.

Controlling component 228 may then instruct comparing component 218 to generate an updated crash probability, $C_{pu}$, indicating a probability that the vehicle has crashed. In an example embodiment, the newly generated signature is compared with the previously-stored signature. Again, any known method of comparing two signatures to generate such a probability may be used.

In an example embodiment, a comparison is made between similar parameter signals. For purposes of discussion, let the previously generated crash probability $C_p$ be based on the newly-detected magnetic field as detected by field-detecting component 212 and on a newly-detected deceleration in three dimensions as detected by detecting component 402. Now, let the updated, generated crash probability $C_{pu}$ be based on: 1) the newly-detected magnetic field as detected by field-detecting component 212; 2) the newly-detected deceleration in three dimensions as detected by detecting component 402; and 3) a newly-detected vibration as detected by detecting component 406.

The new comparison may include: a comparison of the function corresponding to the previously-detected magnetic field and the function corresponding to the newly-detected magnetic field; a comparison of the second function corresponding to a previously-detected deceleration in three dimensions and the second function corresponding to the newly-detected deceleration in three dimensions; and a comparison of the second function corresponding to a previously-detected vibration and the second function corresponding to the newly-detected vibration.

Returning to FIG. 3, after the crash probability is updated (S320), it is again determined whether the generated crash probability is greater than or equal to the predetermined probability threshold (S312). Continuing the example discussed above, now that many more parameters have been considered in the comparison, the updated crash probability $C_p$, which is now $C_{pu}$, is greater than or equal to the probability threshold $T_p$. For example, although the previous comparison between only two parameters provided a relatively low probability, the additional parameters greatly increased the probability. For example, consider the situation where the detected magnetic field and the detected deceleration in three dimensions are sufficiently dissimilar to the previously stored magnetic field and deceleration in three dimensions associated with a vehicle crash. However, now that more parameters are considered, e.g., sound, velocity, vibrations and change in geodetic position, it may be more likely that vehicle has, in fact, crashed.

Returning to FIG. 3, if an additional parameter is not to be detected (N at S316), then the device is not operated in the crash mode (S322). If the crash probability $C_p$ is ultimately lower than the predetermined probability threshold $T_p$, then it is determined that the vehicle has not crashed. As such, device 202 would not be operating in the crash mode.

Returning to FIG. 3, it is then determined whether the current operating mode has been switched to the crash mode (S324). For example, returning to FIG. 2, there may be situations where a user would like device 202 to operate in a crash mode, even though device 202 is not currently operating in such a mode. In those situations, user 202 may be able to manually change the operating mode of device 202. For example, a GUI of input component 214 may enable the user to instruct controlling component 228, via communication line 232, to operate in a specific mode.

Returning to FIG. 3, if it is determined that the current operating mode has been switched to the crash mode (Y at S324), then the device is operated in a crash mode (S314).

Alternatively, if it is determined that the mode has not been switched (N at S324), then it is determined whether the device has been turned off (S326). For example, returning to FIG. 2, there may be situations where a user turns off device 202 or device 202 runs out of power. If it is determined that the device has not been turned off (N at S326), the process repeats and it is determined whether the device is in a vehicle (S304). Alternatively, if it is determined that the device has been turned off (Y at S326), the method 300 stops (S328).

In some embodiments, when it is determined that device 202 is in a vehicle (Y at S304), field-detecting component 212 and parameter-detecting component 222 may be operated to detect respective parameters at the fasted rate possible. In this manner, a crash may be accurately detected as soon as possible, but much power may be expended in device 202.

In some embodiments, when it is determined that device 202 is in a vehicle (Y at S304), field-detecting component 212 and parameter-detecting component 222 may be adjusted to operate to detect respective parameters at the lower rate. In this manner, a crash may be accurately detected as with some delay, but power of device 202 may be saved. In an example embodiment, a user is able to adjust the detection rate of field-detecting component 212 and parameter-detecting component 222 by way of the GUI in input component 214.

Aspects of the present invention enable a communication device to accurately determines whether a vehicle as crashed without accessing the OBD of the vehicle. In particular, a communication device in accordance with aspects of the present invention can accurately detect a vehicle crash by detecting that it is in a vehicle, detecting a first parameter associated with a crash, detecting a second parameter associated with a crash, generating a crash probability and comparing the crash probability with a predetermined threshold. By detecting a crash based on being in a vehicle and based on two additionally detected parameters, the likelihood of erroneously detecting a crash is greatly reduced.

In the drawings and specification, there have been disclosed embodiments of the invention and, although specific terms are employed, they are used in a generic and descriptive sense only and not for purposes of limitation, the scope of the invention being set forth in the following claims.

What is claimed as new and desired to be protected by Letters Patent of the United States is:

1. A device for use with a vehicle, said device comprising:

a mode-determining component operable to detect whether the device is in the vehicle and to generate an in-vehicle signal;

a first detecting component operable detect a first parameter and to generate a first detector signal based on the first detected parameter; and a second detecting component operable detect a second parameter and to generate a second detector signal based on the second detected parameter;

wherein said mode-determining component is further operable to generate a crash mode signal based on the in-vehicle signal, the first detector signal and the second detector signal.

2. The device of claim 1, wherein said first detecting component is operable to detect, as the first parameter, one of the group consisting of magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof.

3. The device of claim 2, wherein said first detecting component is operable to detect, as the first parameter, a parameter associated with deployment of an airbag within the vehicle.

4. The device of claim 2, wherein said first detecting component is operable to detect, as the first parameter, acceleration along a single axis, and wherein said first detecting component is operable to generate the first detector signal when the detected acceleration along the single axis is equal to or greater than a predetermined value.

5. The device of claim 1, further comprising a communication component operable to wirelessly communicate with a network.

6. The device of claim 1, further comprising:

an operating component operable to operate in a first mode and a second mode, wherein said operating component is operable to switch from operating in the first mode to operating in the second mode based on the crash mode signal.

7. A method for use with a vehicle, said method comprising:

detecting, via a mode-determining component, whether the mode-determining component is in the vehicle;

generating, via the mode-determining component, an in-vehicle signal;

detecting, via a first detecting component, a first parameter;

generating, via the first detecting component, a first detector signal based on the first detected parameter;

detecting, via a second detecting component, a second parameter;

generating, via the second detecting component, a second detector signal based on the second detected parameter; and generating, via the mode-determining component, a crash mode signal based on the in-vehicle signal, the first detector signal and the second detector signal.

8. The method of claim 7, wherein said detecting a first parameter comprises detecting one of the group consisting of magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electromagnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof.

9. The method of claim 8, wherein said detecting a first parameter comprises detecting a parameter associated with deployment of an airbag within the vehicle.

10. The method of claim 8, wherein said detecting a first parameter comprises detecting acceleration along a single axis, and wherein said generating a first detector signal comprises generating the first detector signal when the detected acceleration along the single axis is equal to or greater than a predetermined value.

11. The method of claim 7, further comprising wirelessly communicating, via a communication component, with a network.

12. The method of claim 7, further comprising:

operating an operating component in a first mode; and switching operation of the operating component from the first mode to a second mode based on the crash mode signal.

13. A non-transitory, computer-readable media having computer-readable instructions stored thereon, for use with a vehicle, the computer-readable instructions being capable of being read by a computer and being capable of instructing the computer to perform the method comprising:

detecting, via a mode-determining component, whether the mode-determining component is in the vehicle;

generating, via the mode-determining component, an in-vehicle signal;

detecting, via a first detecting component, a first parameter;

generating, via the first detecting component, a first detector signal based on the first detected parameter;

detecting, via a second detecting component, a second parameter;

generating, via the second detecting component, a second detector signal based on the second detected parameter;

operating an operating component in a first mode;

generating, via the mode-determining component, a crash mode signal based on the in-vehicle signal, the first detector signal and the second detector signal; and switching operation of the operating component from the first mode to a second mode based on the crash mode signal.

14. The non-transitory, computer-readable media of claim 13, wherein the computer-readable instructions are capable of instructing the computer to perform the method such that said detecting a first parameter comprises detecting one of the group consisting of magnetic fields in any of three dimensions, electric fields in any of three dimensions, electro-magnetic fields in any of three dimensions, velocity in any of three dimensions, acceleration in any of three dimensions, angular velocity in any of three dimensions, angular acceleration in any of three dimensions, geodetic position, sound, temperature, vibrations in any of three dimensions, pressure in any of three dimensions, biometrics, contents of surrounding atmosphere, a change in electric fields in any of three dimensions, a change in magnetic fields in any of three dimensions, a change in electro-magnetic fields in any of three dimensions, a change in velocity in any of three dimensions, a change in acceleration in any of three dimensions, a change in angular velocity in any of three dimensions, a change in angular acceleration in any of three dimensions, a change in geodetic position in any of three dimensions, a change in sound, a change in temperature, a change in vibrations in any of three dimensions, a change in pressure in any of three dimensions, a change in biometrics, a change in contents of surrounding atmosphere and combinations thereof.

15. The non-transitory, computer-readable media of claim 14, the computer-readable instructions being capable of being read by a computer and being capable of instructing the computer to perform the method such that said detecting a first parameter comprises detecting a parameter associated with deployment of an airbag within the vehicle.

16. The non-transitory, computer-readable media of claim 14, wherein the computer-readable instructions are capable of instructing the computer to perform the method such that said detecting a first parameter comprises detecting acceleration along a single axis, and said generating a first detector signal comprises generating the first detector signal when the detected acceleration along the single axis is equal to or greater than a predetermined value.

17. The non-transitory, computer-readable media of claim 13, the computer-readable instructions being capable of being read by a computer and being capable of instructing the computer to perform the method further comprising wirelessly communicating, via a communication component, with a network.

18. The non-transitory, computer-readable media of claim 13, the computer-readable instructions being capable of being read by a computer and being capable of instructing the computer to perform the method further comprising:

operating an operating component in a first mode; and switching operation of the operating component from the first mode to a second mode based on the crash mode signal.

* * * * *